No. 869,059. PATENTED OCT. 22, 1907.
C. E. CASHMORE.
FASTENING DEVICE.
APPLICATION FILED JAN. 14, 1907.
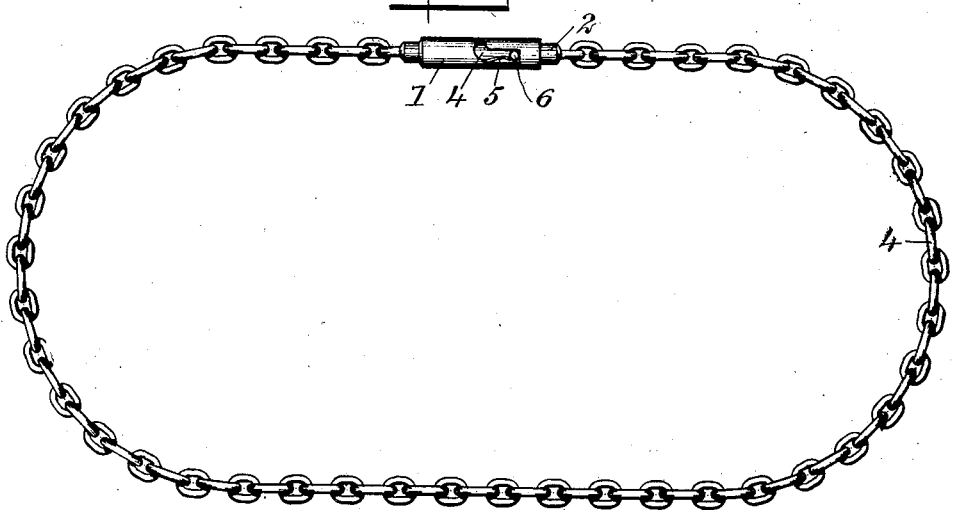
 
WITNESSES
INVENTOR
Charles E. Cashmore
BY
ATTORNEYS

UNITED STATES PATENT OFFICE.

CHARLES ERNEST CASHMORE, OF NEW YORK, N. Y.

FASTENING DEVICE.

No. 869,059.      Specification of Letters Patent.      Patented Oct. 22, 1907.

Application filed January 14, 1907. Serial No. 352,182.

*To all whom it may concern:*

Be it known that I, CHARLES ERNEST CASHMORE, a citizen of the United States, and a resident of the city of New York, borough of Manhattan, county and State of New York, have invented a new and Improved Fastening Device, of which the following is a full, clear, and exact description.

This invention relates to improvements in fastening devices, especially such as are used in connecting together the two ends of a necklace or other ornamental chain. The invention, however, is not limited to this particular use, as it may be employed with advantage in connection with other jewelry or articles.

The object of the invention is to provide a simple fastening device which will not become accidentally uncoupled in use, but which may be readily separated and connected when desired even when placed in awkward positions, as for example, at the back of the neck, which place a fastening for a necklace is ordinarily located.

Reference is to be had to the accompanying drawings forming a part of this specification, in which similar characters of reference indicate corresponding parts in all the figures.

Figure 1 is a plan of a chain having its two ends coupled together with one embodiment of my improvement; Fig. 2 is an enlarged view of the fastening device at right angles to Fig. 1, and Fig. 3 is a view of the fastening device the same as shown in Fig. 1, but on an enlarged scale.

In carrying out my invention I employ two members 1 and 2, respectively, each of which is preferably provided with an eye 3 at its outer end for attaching the ends of a chain or other device.

The member 1 is in the nature of a tube having a hook-shaped slot 4 formed longitudinally in its outer end, said slot comprising two arms, the shorter of which is provided at one edge near its extremity with a spring tongue 5, said tongue having the material removed sufficiently from its under edge in order that it may readily yield. The tongue 5 is, moreover, curved or humped to slightly contract the width of the shorter arm of the slot.

The member 2 is of such form and diameter as to freely slide within the tubular member 1, and is provided with a pin or projection 6 at one side thereof adapted to engage with the slot 4 when the device is assembled. The projection 6 is of such diameter as to neatly fit the slot 4, and is engaged and retained therein by the tongue 5 when said pin is carried to the position illustrated in Fig. 3. When the projection is in this position it is necessary in order to disconnect the members 1 and 2, that they be forced together with a slight pressure to disengage the projection and tongue and thereafter give them a slight, relative turn when they may be separated, as is obvious.

Although I have described the preferred construction of the invention in detail, in order that the same might be clearly understood, I, nevertheless, regard the precise embodiment as not material and consider that I am entitled to such modifications as fall within the scope of the annexed claims.

Having thus described my invention I claim as new and desire to secure by Letters Patent:

1. A fastening device comprising a tubular member having a slot consisting of a long and a short arm, a second member fitting within said tubular member, a projection on said second member passing into said slot, and a spring tongue formed at one side of the short arm of said slot for engaging said projection.

2. A fastening device comprising a tubular member having a hook-shaped slot formed therein consisting of a long and a short arm, a second member fitting within said tubular member, a projection on said second member passing into said slot, and means formed at one side of the short arm of said slot for engaging said projection and locking it therein.

3. A fastening device comprising a tubular member having a slot, a second member slidable within said tubular member, a projection on said second member passing into said slot, and resilient means fixed at the edge of said slot for locking said projection therein.

4. A fastening device comprising a tubular member having a slot, a second member slidable within said tubular member having a projection adapted to slide in said slot, and a spring tongue arranged at one edge of said slot acting to lock said projection therein.

In testimony whereof I have signed my name to this specification in the presence of two subscribing witnesses.

CHARLES ERNEST CASHMORE.

Witnesses:
ELIZABETH VOGEL,
J. R. GORHAM.